（12）United States Patent
Tarui

(10) Patent No.: US 10,061,305 B2
(45) Date of Patent: Aug. 28, 2018

(54) CONTROLLER FOR DETERMINING ABNORMALITY OF A PULSE OUTPUTTER

(71) Applicant: DENSO CORPORATION, Kariya, Aichi-pref. (JP)

(72) Inventor: Jun Tarui, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/454,179

(22) Filed: Mar. 9, 2017

(65) Prior Publication Data

US 2017/0261966 A1   Sep. 14, 2017

(30) Foreign Application Priority Data

Mar. 11, 2016   (JP) .................................. 2016-48421

(51) Int. Cl.
| | |
|---|---|
| G05B 1/06 | (2006.01) |
| G05B 19/4155 | (2006.01) |
| G05B 23/02 | (2006.01) |
| H02P 31/00 | (2006.01) |
| H02P 29/024 | (2016.01) |
| H02P 6/16 | (2016.01) |

(52) U.S. Cl.
CPC ..... G05B 19/4155 (2013.01); G05B 23/0208 (2013.01); H02P 6/16 (2013.01); H02P 29/024 (2013.01); H02P 31/00 (2013.01); G05B 2219/33289 (2013.01); G05B 2219/34013 (2013.01)

(58) Field of Classification Search
CPC .......................... G05B 19/4155; G05B 23/0208

USPC ......................................................... 318/652
See application file for complete search history.

(56) References Cited

U.S. PATENT DOCUMENTS

| | | | | |
|---|---|---|---|---|
| 2007/0046226 A1* | 3/2007 | Takahashi | ............ | H02H 7/0851 318/268 |
| 2009/0256613 A1* | 10/2009 | Suzuki | ................... | B41J 11/007 327/291 |
| 2009/0256615 A1* | 10/2009 | Suzuki | ................... | B41J 11/008 327/298 |
| 2013/0076290 A1 | 3/2013 | Yoshida | | |
| 2014/0060486 A1* | 3/2014 | Maezawa | ................ | F02D 45/00 123/350 |
| 2014/0347767 A1* | 11/2014 | Nakamura | .............. | H02M 1/32 361/18 |

(Continued)

FOREIGN PATENT DOCUMENTS

| | | |
|---|---|---|
| JP | 2001-201364 | 7/2001 |
| JP | 2013-102667 | 5/2013 |

*Primary Examiner* — Erick Glass
(74) *Attorney, Agent, or Firm* — Nixon & Vanderhye PC

(57) ABSTRACT

A controller has an encoder that outputs four-phase pulse signals according to a rotation of a rotor of a motor by a rule. During a rotational drive of the motor, when (i) an abnormal pulse state is observed in which the pulse signal is output in a non-compliant manner with the rule and (ii) a lapse time from a last normal output timing, which is a last timing of an output of the pulse signal by the rule, is longer than a threshold determination time, it is conclusively determined that the encoder has abnormality. Thus, the encoder is provided with an improved noise-proof character, and is prevented from being falsely determined as abnormal due to the abnormal pulse state, even when an output of the pulse signal from the encoder is temporarily ridden by a noise.

7 Claims, 14 Drawing Sheets

(56) References Cited

U.S. PATENT DOCUMENTS

2015/0085539 A1\* 3/2015 Ueda ..................... H02H 5/04
363/56.01

\* cited by examiner

FIG. 5

| PATTERN | A PHASE | B PHASE | C PHASE | D PHASE | NORMAL/ABNORMAL |
|---|---|---|---|---|---|
| 0 | L | L | L | L | NORMAL |
| 1 | H | L | L | L | NORMAL |
| 2 | L | H | L | L | ABNORMAL |
| 3 | H | H | L | L | ABNORMAL |
| 4 | L | L | H | L | ABNORMAL |
| 5 | H | L | H | L | NORMAL |
| 6 | L | H | H | L | ABNORMAL |
| 7 | H | H | H | L | NORMAL |
| 8 | L | L | L | H | NORMAL |
| 9 | H | L | L | H | ABNORMAL |
| A | L | H | L | H | NORMAL |
| B | H | H | L | H | ABNORMAL |
| C | L | L | H | H | ABNORMAL |
| D | H | L | H | H | ABNORMAL |
| E | L | H | H | H | NORMAL |
| F | H | H | H | H | NORMAL |

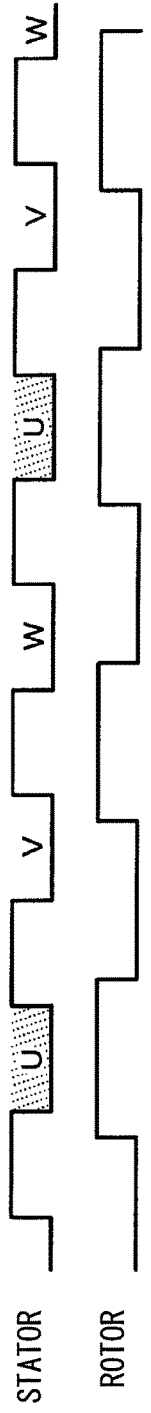
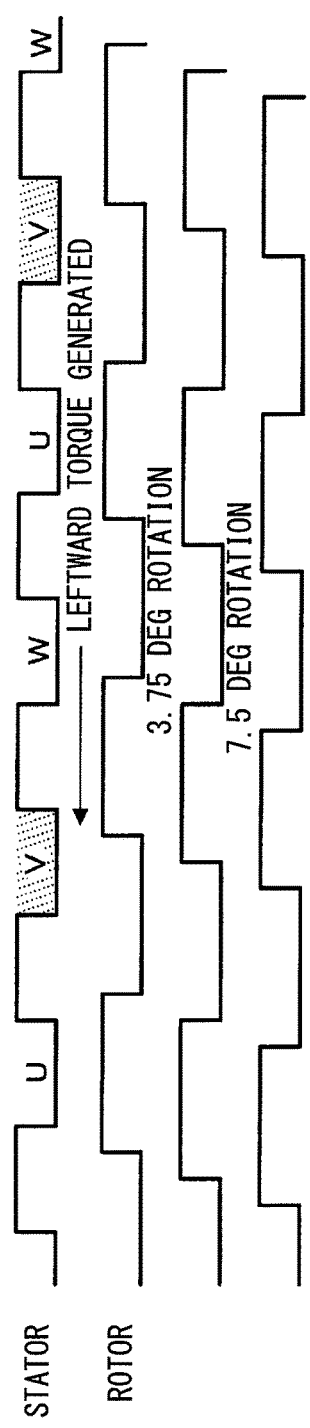
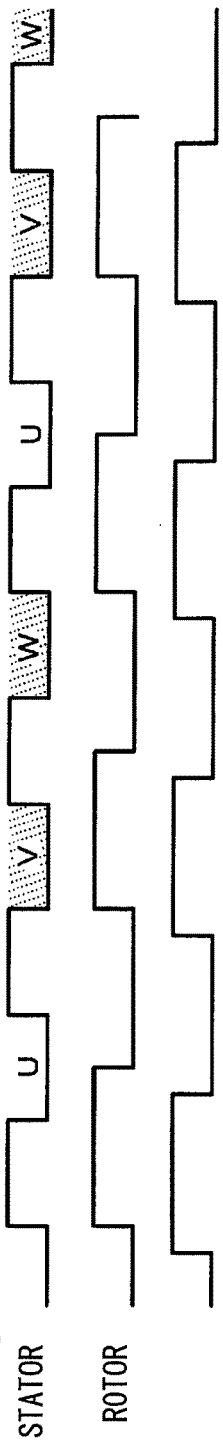
FIG. 14A
FIG. 14B
FIG. 14C

CONTROLLER FOR DETERMINING ABNORMALITY OF A PULSE OUTPUTTER

CROSS REFERENCE TO RELATED APPLICATION

The present application is based on and claims the benefit of priority of Japanese Patent Application No. 2016-048421, filed on Mar. 11, 2016, the disclosure of which is incorporated herein by reference.

TECHNICAL FIELD

The present disclosure generally relates to a controller having a pulse output section that outputs a pulse signal according to rotation of a measurement object.

BACKGROUND INFORMATION

In recent years, a transition from a mechanically-driven system to an electrically-driven system is on high demand, for aiming at an improvement of a space efficiency, assemblability, controllability and the like, especially required in vehicles. One of the examples of such transition is that a shift position switch mechanism for switching a shift position, or a gear position among P (Park) position, D (Drive) position and the like, in an automatic transmission of a vehicle is devised with a motor to drive the switching between those shift positions.

Such a shift position switch mechanism is equipped with an encoder that outputs a pulse signal at every predetermined angle in synchronization with rotation of the motor, and switches the power supply phases of the motor one by one based on a count value of the output signal of the encoder, to perform a rotational drive of the motor.

In such a system or a mechanism, diagnosis of encoder abnormality is performed, for example, by a technique disclosed in a patent document, JP 2013-72773 A (patent document 1). The technique disclosed in the patent document 1 is applied to an encoder that outputs a three-phase pulse signal, and, when the pulse signal is abnormal in one of the three phases, such an abnormality is picked up, i.e., is detected, as an abnormal pattern of the pulse signal combination, for the detection of the encoder abnormality.

However, the above-mentioned patent document 1 is silent about a noise handling measure for handling an overlapping noise on the output signal from the encoder, making the system prone to a false determination of the encoder abnormality when it is actually not the case, i.e., when the encoder is normally operating.

SUMMARY

It is an object of the present disclosure to provide a controller that has improved noise-proof characteristics.

In an aspect of the present disclosure, the controller includes a pulse outputter outputting a pulse signal according to a rotation of a measurement object, in which the pulse signal outputted as a signal having at least three phases by a rule according to the rotation of the measurement object, and a determiner determining whether the pulse outputter has abnormality based on the pulse signal, and the determiner is configured to conclusively determine that the pulse outputter has abnormality when (i) it is determined as being in an abnormal pulse state in which output of the pulse signal is performed in a non-compliant manner with the rule, and (ii) a lapse time from a last normal output timing is longer than a threshold determination time.

When abnormality occurs in the pulse outputter of the encoder (e.g., when the pulse signal from the outputter adheres to a high (H) level or to a low (L) level in one of the three phases), an abnormal pulse state occurs (i.e., the pulse signal is output in a state that is not compliant with a rule). Also, when a noise overlaps, or rides on, the output signal of the pulse outputter, the abnormal pulse state occurs.

However, when the noise overlaps the output signal of the pulse outputter to cause the abnormal pulse state, a lapse time from the last normal output timing of the pulse signal to a timing of when the abnormal pulse state occurs is shorter than a pulse cycle of normal time (i.e., the above lapse time becomes shorter than an interval of pulse output timings that are compliant with a rule). Further, such an overlap of the noise usually returns to, i.e., is considered as returning to, a normal pulse state (i.e., returns to a state in which the pulse signal is output by, or according to, a rule) in a relatively short time.

In view of such characteristic behavior of the noise overlap signal, i.e., a noise ridden signal, the determiner/controller of the present disclosure is configured to conclusively determine (a) that abnormality has occurred in the pulse outputter and to conclusively determine (b) that the pulse outputter has an abnormality when (i) it is determined as being in the abnormal pulse state, and (ii) the lapse time from the last normal output timing is longer than the preset threshold determination time.

In addition, even when the lapse time from the last normal output timing is equal to or shorter than the preset threshold determination time when the abnormal pulse state occurs, in case that the lapse time in the abnormal pulse state continues/extends thereafter to exceed the preset threshold determination time, the determiner/controller of the present disclosure is configured to determine that abnormality has occurred in the pulse outputter and to conclusively determine that the pulse outputter has abnormality.

On the other hand, even when the abnormal pulse state occurs, in case that the abnormal pulse state returns to the normal pulse state before the lapse time exceeds the preset threshold determination time, it is determined that the abnormal pulse state is temporarily caused due to an overlap of a noise on the pulse signal that is output from the pulse outputter, that is, it is not conclusively determined that the pulse outputter has abnormality.

Therefore, when the abnormal pulse state is temporarily caused due to an overlap of a noise on the pulse signal that is output from the pulse outputter, a false determination by the determiner falsely determining that the pulse outputter has abnormality is prevented, thereby providing the determiner/controller with improved noise-proof characteristics.

BRIEF DESCRIPTION OF THE DRAWINGS

Objects, features, and advantages of the present disclosure will become more apparent from the following detailed description made with reference to the accompanying drawings, in which:

FIG. 5 is a table of pulse signal combination patterns of four phases including a normal pattern and an abnormal pattern in the one embodiment of the present disclosure;

FIG. 14A is a time chart of an example of power supply phase switching in a rotational drive of a motor in the one embodiment of the present disclosure;

FIG. 14B is another time chart of an example of power supply phase switching in a rotational drive of a motor in the one embodiment of the present disclosure; and FIG. 14C is another time chart of an example of power supply phase switching in a rotational drive of a motor in the one embodiment of the present disclosure.

DETAILED DESCRIPTION

One embodiment for implementing the present disclosure is described in the following.

Figure 1:
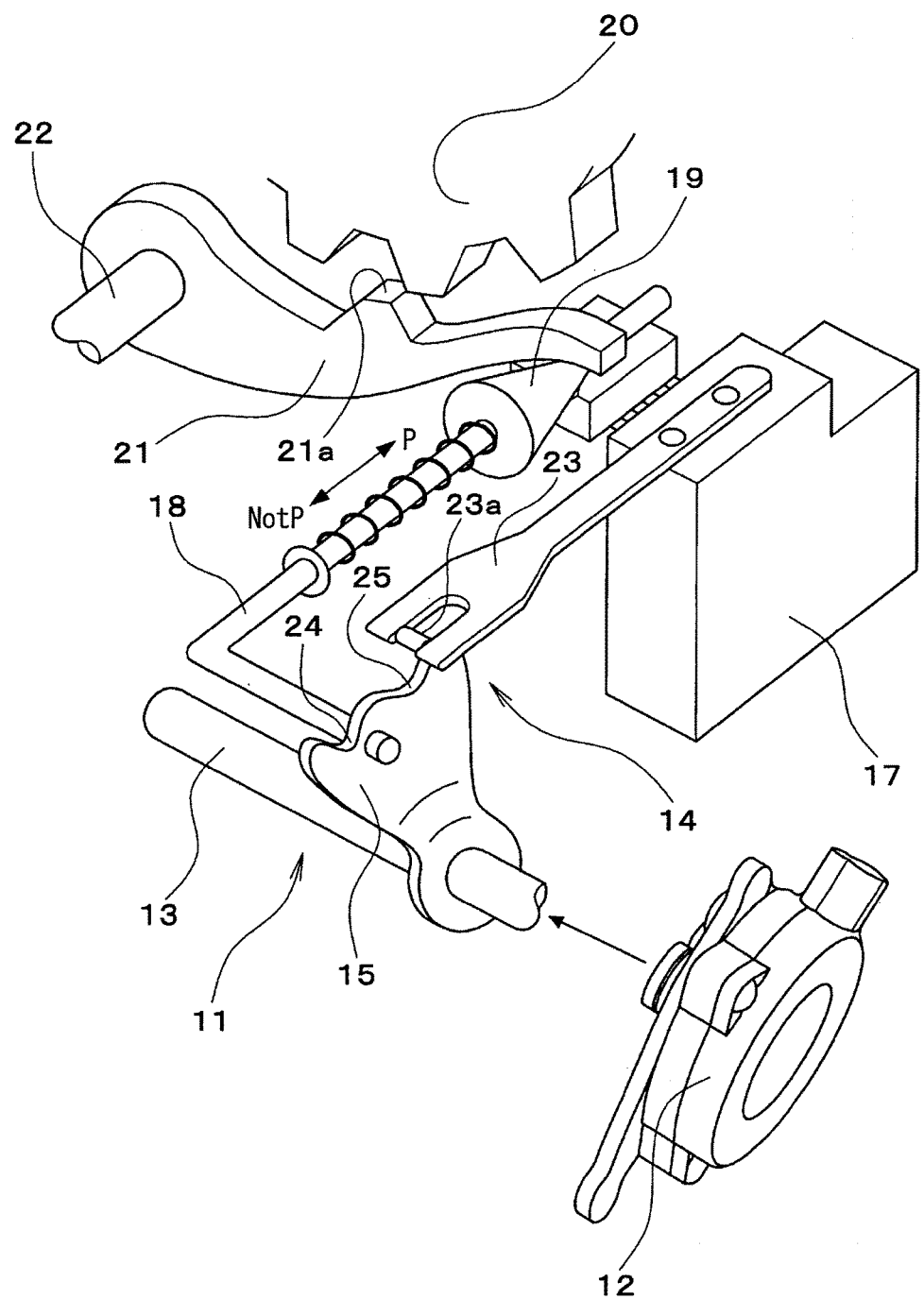
FIG. 1 is a perspective view of a shift position switch mechanism in one embodiment of the present disclosure.
Figure 2:
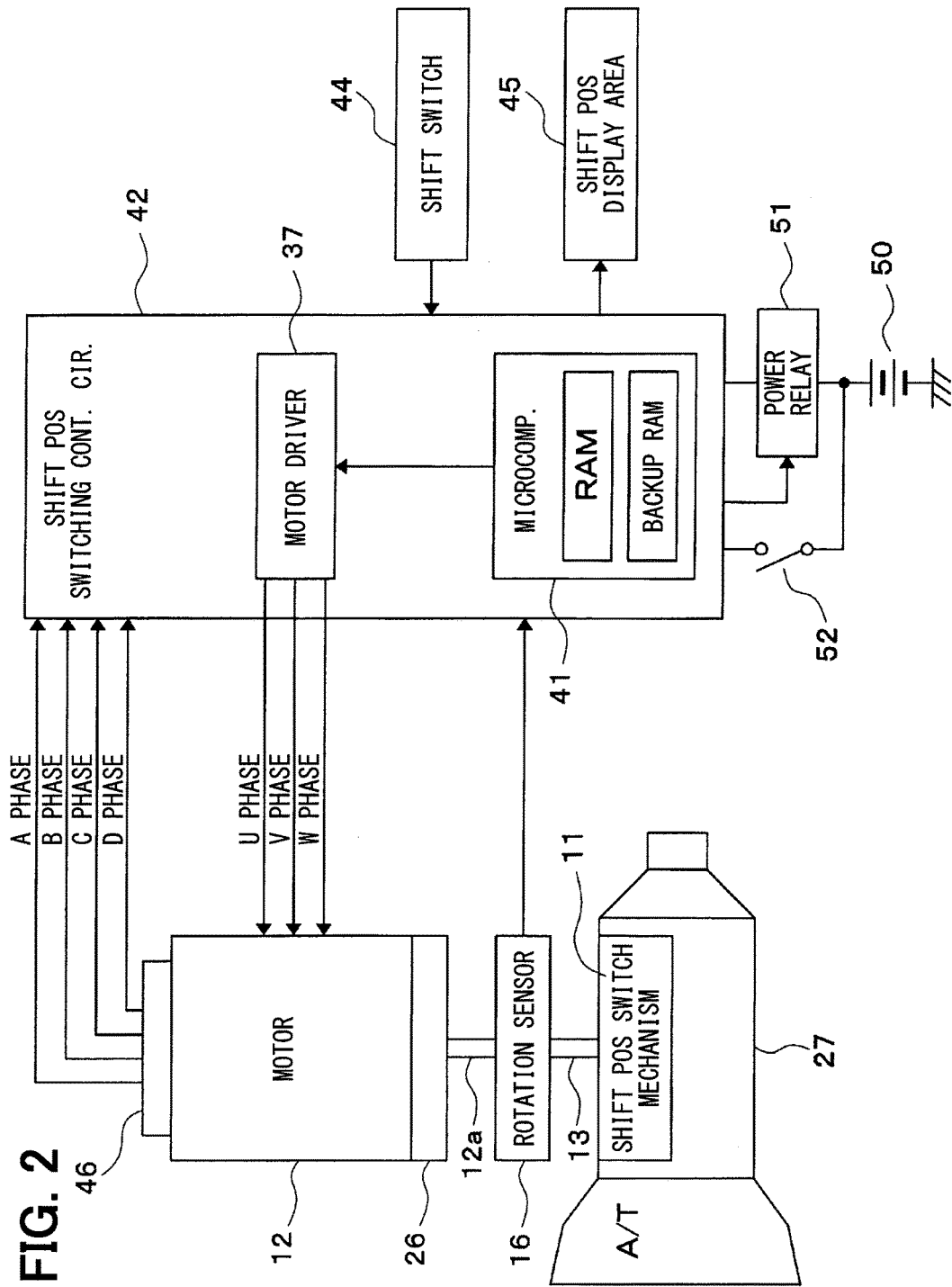
FIG. 2 is a block diagram of a shift position switch controller in the one embodiment of the present disclosure.

First, the configuration of the shift position switch control system is described based on FIGS. 1 and 2.

As shown in FIGS. 1 and 2, a shift position switch mechanism 11 is a 2-position type shift position switch mechanism that switches the shift position of an automatic transmission 27 disposed in a vehicle between a P position and a Non-P position. Here, the P position means a park position, and the Non-P position means ranges other than the P position.

A motor 12 used as a driving power source of the shift position switch mechanism 11 is provided as a switched-reluctance motor, for example, a speed reducer 26 is built into the motor 12, and a manual shaft 13 of the shift position switch mechanism 11 is connected to an output shaft 12a of the motor 12. Further, a detent lever 15 is fixedly attached to the manual shaft 13.

The detent lever 15 has a parking rod 18 of L type fixedly attached thereto, and a conic body 19 provided at a tip part of the parking rod 18 is in contact with a lock lever 21.

The lock lever 21 moves up and down centering on a shaft 22 according to the position of the conic body 19, and the lock/unlock of a park gear 20 is switched by such movement of the lock lever 21. The park gear 20 is disposed on an output shaft of the automatic transmission 27. When the park gear 20 is locked by the lock lever 21, a drive wheel of the vehicle is put in a locked state, i.e., in a park state, for the parking of the vehicle.

Further, a detent spring 23 for holding the detent lever 15 in each of the P position and the Non-P position is fixedly attached to a support base 17. The detent lever 15 has a P position holding concave 24 and a Non-P position holding concave 25 provided thereon.

When an engage portion 23a provided at a tip of the detent spring 23 fits into the P position holding concave 24 of the detent lever 15, the detent lever 15 is held in the P position.

When the engage portion 23a of the detent spring 23 fits into Non-P position holding concave 25 of the detent lever 15, the detent lever 15 is held in the Non-P position.

A detent mechanism 14 for holding the rotation position of the detent lever 15 in each of the positions (i.e., for holding the shift position switch mechanism 11 in the P position and the Non-P position) is made up from these components, i.e., from the detent lever 15, the detent spring 23 and the like.

In the P position, the parking rod 18 moves in one direction, i.e., closer to the lock lever 21, for a thick portion of the conic body 19 to push up the lock lever 21. In such manner, a convex part 21a of the lock lever 21 fits into, i.e., engages, the park gear 20, and locks the park gear 20 in a stop/locked state. Thereby, the output shaft of the automatic transmission 27 is locked, i.e., is put in a parking state.

On the other hand, in the Non-P position, the parking rod 18 moves in the other direction, i.e., moves away from the lock lever 21, and the thick portion of the conic body 19 comes back from the lock lever 21, which allows the lock lever 21 to move down. In such manner, the convex part 21a of the lock lever 21 is disengaged from the park gear 20, and the lock of the park gear 20 is released. Thereby, the output shaft of the automatic transmission 27 is unlocked, i.e., is put in a rotatable state.

As shown in FIG. 2, a rotation sensor 16 for detecting a rotation angle (i.e., a rotation position) of the manual shaft 13 is disposed on the manual shaft 13 of the shift position switch mechanism 11.

The rotation sensor 16 is provided as a sensor (e.g., a potentiometer) outputting a voltage according to the rotation angle of the manual shaft 13. Based on the output voltage of the rotation sensor 16, it is confirmable whether an actual shift position of the shift position switch mechanism 11 is in the P position or in the Non-P position.

An encoder 46 for detecting the rotation angle (i.e., a rotation position) of a rotor 32 is disposed on the motor 12. The encoder 46 may be provided as a magnetic-type rotary encoder, for example.

The encoder 46 is configured so that a pulse signal is output in four phases (i.e., in A phase, B phase, C phase, and D phase) in synchronization with the rotation of the rotor 32 of the motor 12.

The encoder 46 is equivalent to a pulse outputter as recited in the claims.

Figure 3:
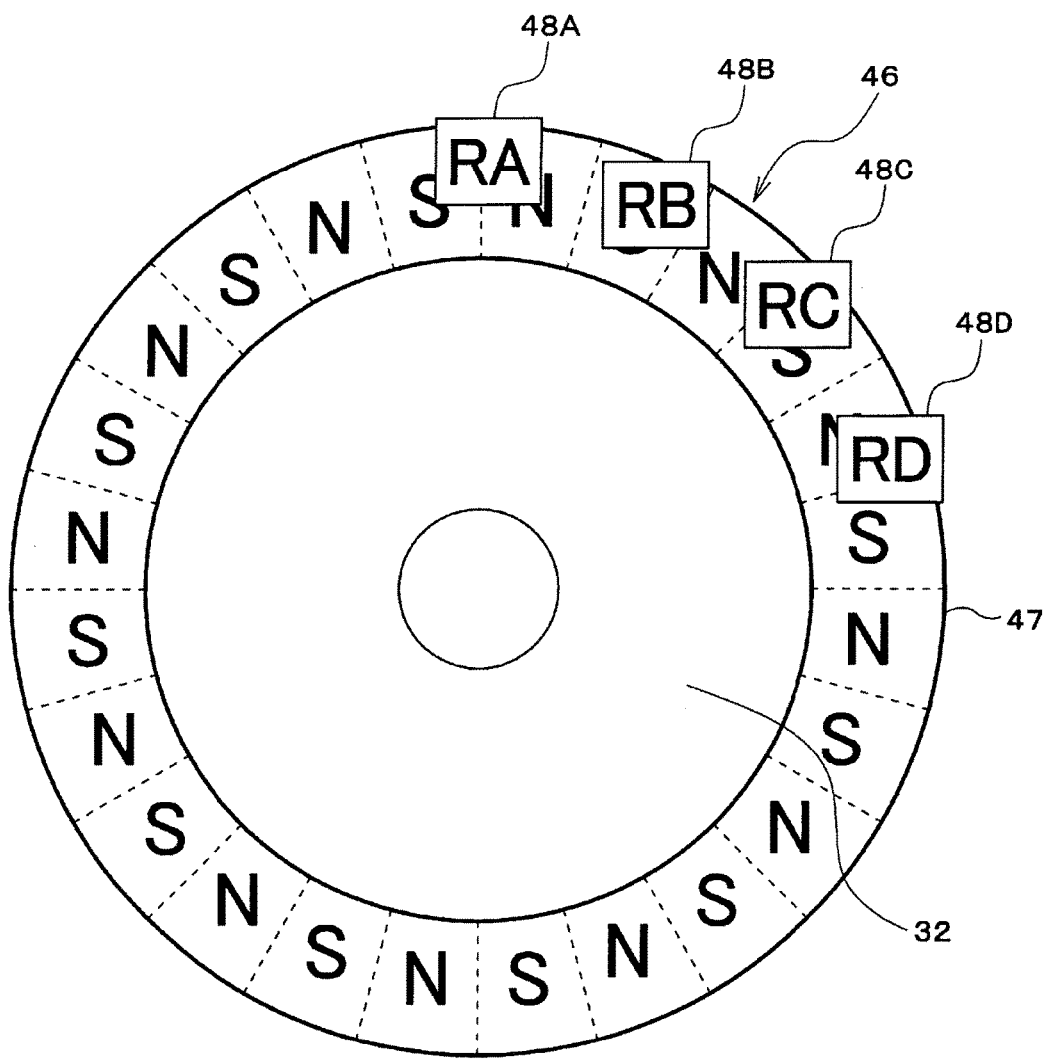
FIG. 3 is an illustration of a configuration of an encoder in the one embodiment of the present disclosure.

A more practical configuration of the encoder 46 is, as shown in FIG. 3, that a ring-shape rotary magnet 47 in which an N pole and an S pole are magnetized thereon in turn at the same pitch is fixedly attached to the rotor 32 in a co-axial manner. Further, at four facing positions facing the rotary magnet 47, four magnetism detecting elements 48A-48D, e.g. four hole Integrated Circuits (ICS), are disposed.

In the present embodiment, the magnetization pitch of the N poles and the S poles is set as 15 degrees, resulting in 12 N poles and 12 S poles provided on the magnet 47.

The magnetism detecting elements 48A-48D are arranged in the following manner relative to the rotary magnet 47.

In the following description, the magnetism detecting element 48A outputting an A phase signal is designated as a "magnetism detecting element 48A of the A phase." Likewise, a magnetism detecting element 48B outputting a B phase signal is designated as a "magnetism detecting element 48B of the B phase," and a magnetism detecting element 48C outputting a C phase signal is designated as a "magnetism detecting element 48C of the C phase," and a magnetism detecting element 48D outputting a D phase signal is designated as a "magnetism detecting element 48D of the D phase."

Figure 4:
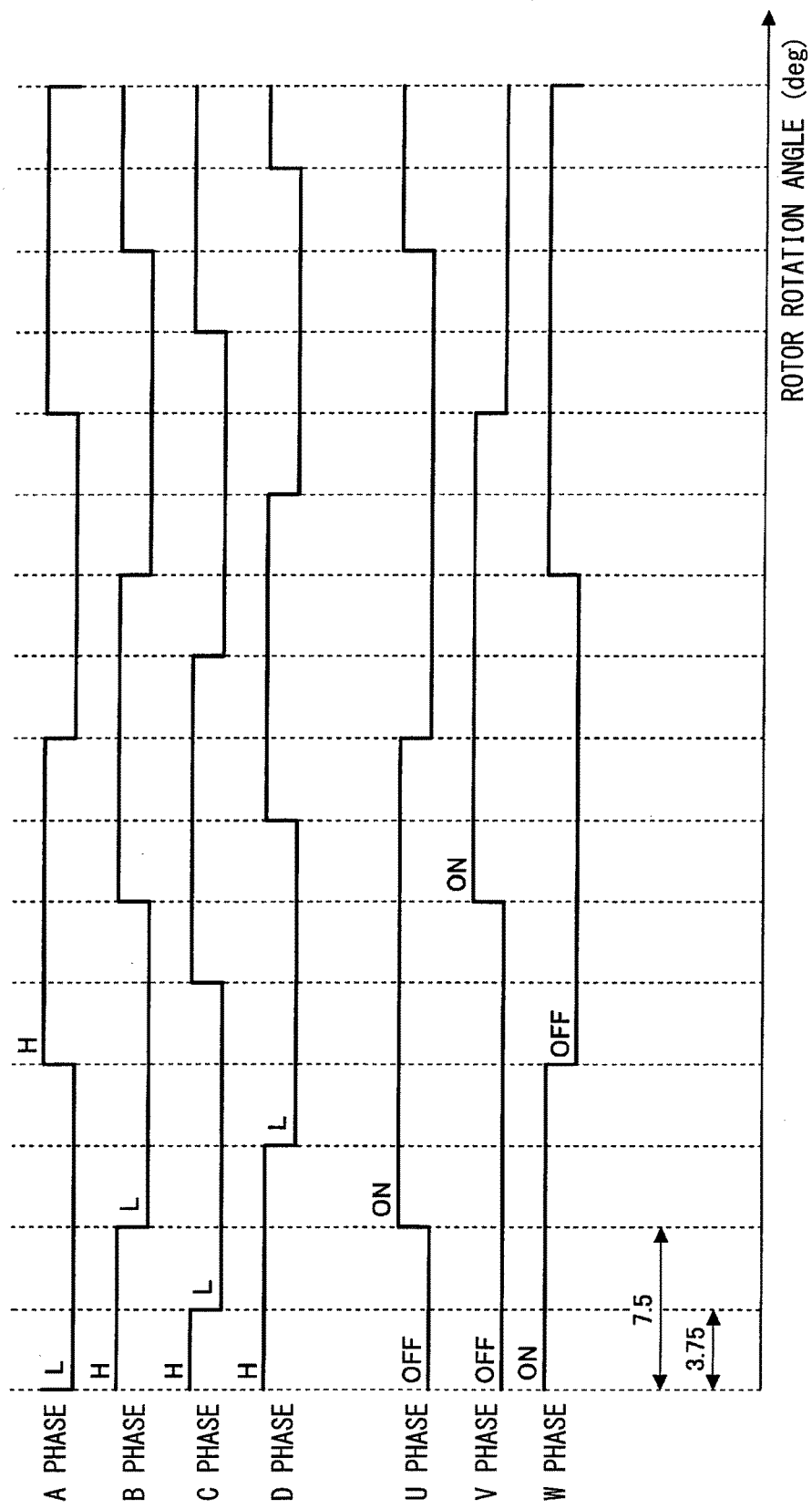
FIG. 4 is an illustration of an output wave and a power supply phase switch pattern of the encoder in the one embodiment of the present disclosure.

The magnetism detecting element 48A of the A phase and the magnetism detecting element 48C of the C phases are arranged, as shown in FIG. 4, to have a phase difference of 3.75 degrees in the mechanical angle between the A phase signal and the C phase signal.

The magnetism detecting element 48C of the C phases and the magnetism detecting element 48B of the B phase are arranged, as shown in FIG. 4, to have the phase difference of 3.75 degrees in the mechanical angle between the C phase signal and the B phase signal.

The magnetism detecting element 48B of the B phase and the magnetism detecting element 48D of the D phases are arranged, as shown in FIG. 4, to have the phase difference of 3.75 degrees in the mechanical angle between the B phase signal and the D phase signal.

Therefore, the phase difference between the A phase signal and the B phase signal is set as 7.5 degrees in the mechanical angle, and the phase difference between the C phase signal and the D phase signal is set as 7.5 degrees in the mechanical angle.

The output of each the magnetism detecting elements 48A-48D is in the high (H) level at a time of facing the N pole, and is in the low (L) level at a time of facing the S pole.

The encoder 46 configured in such manner outputs the pulse signal in the four phases by, i.e., in accordance with, a preset rule according to the rotation of the rotor 32 of the motor 12, as shown in FIG. 4. That is, the output of the pulse signal in four phases happens at a preset cycle, and happens with a preset phase difference.

In such case, as shown in FIG. 5, among 16 combination patterns of pulse signals, patterns 0, 1, 5, 7, 8, A, E, and F are recognized as a normal pulse state, in which the pulse signal is output by, or according to, the preset rule, and, patterns 2, 3, 4, 6, 9, B, C, and D are recognized as an abnormal pulse state, in which the pulse signal is output in a non-compliant manner with the preset rule.

As shown in FIG. 2, a microcomputer 41 of a shift position switching control circuit 42 counts both of a rising edge and a falling edge of the A phase signal and the B phase signal which are outputted from the encoder 46.

The microcomputer 41 rotates the motor 12, i.e., performs a rotational drive of the motor 12, by switching the power supply phases of the motor 12 in a given order by using a motor driver 37 according to the count value of those edges (henceforth "the encoder count value").

For a fault tolerance of the rotational drive, a combination of the three phase winding wires (i.e., in U/V/W phases) and the motor driver 37 in the motor 12 may be provided in two sets, i.e., as two systems, and the fault in one system may be compensated by the other system.

The microcomputer 41 determines the rotation direction of the motor 12 by seeing an occurrence order of the A phase signal and the B phase signal during the rotation of the motor 12, i.e., when the motor 12 is driven.

The encoder count value is counted up in a forward rotation (e.g., a rotation direction from the P position toward the Non-P position).

The encoder count value is counted down in a backward rotation (e.g., a rotation direction from the Non-P position toward the P position).

In such manner, regardless of the rotation direction the motor 12, i.e., either in the forward rotation or in the backward rotation, a relationship between the encoder count value and the rotation angle of the motor 12 is maintained, i.e., is kept unaffected.

Therefore, based on the encoder count value, the rotation position of the motor 12 is detectable in each of the two rotation directions, i.e., in either of the forward rotation or the backward rotation, for the rotational drive of the motor 12 by switching the power supply phase according to the rotation position of the motor 12.

The shift position switching control circuit 42 receives an input of the signal indicative of an operation position of a shift lever detected by a shift switch 44.

The microcomputer 41 of the shift position switching control circuit 42 switches a target shift position according a driver's operation of the shift lever, and performs a rotational drive of the motor 12 according to the target shift position for the switching of the shift position. Further, after the switching of the shift position, the switched, i.e., an actual, shift position is displayed on a shift position display area 45 that is provided in an instrument panel (not shown in the drawing).

The power supply voltage is supplied to the shift position switching control circuit 42 via a power relay 51 from a battery 50 (i.e., from a power supply) that is disposed in the vehicle.

ON and OFF of the power relay 51 is switched by manually operating an Ignition (IG) switch 52 (i.e., an ignition switch) to an ON or OFF position, which is provided as an electric power switch.

When the IG switch 52 is turned ON, the power relay 51 is turned ON and the power supply voltage is supplied to the shift position switching control circuit 42. When the IG switch 52 is turned OFF, the power relay 51 is turned OFF and the power supply to the shift position switching control circuit 42 is intercepted.

Note that, since the encoder count value is memorized by a RAM of the microcomputer 41, the memory of the encoder count value disappears when the power supply to the shift position switching control circuit 42 is turned OFF.

Therefore, the encoder count value immediately after turning ON of the shift position switching control circuit 42 does not correspond to the actual rotation position or to the actual power supply phase of the motor 12.

Therefore, in order to switch the power supply phases according to the encoder count value, it is necessary to establish the relationship between the encoder count value and the actual rotation position of the motor 12 after the turning ON of the control circuit 42, to associate the encoder count value with the power supply phase in an appropriately corresponding manner.

Then, the microcomputer 41 performs an initial drive after the turning ON of the power supply, and learns a relationship, i.e., correspondence, between the power supply phase of the motor 12 and the encoder count value.

In the initial drive of the motor 12, the motor 12 is provided with one round of the switching of the power supply phases at a preset time schedule under an open loop control, in which the actual rotation position of the motor 12 and the power supply phase are matched at some point, i.e., in a certain phase, thereby enabling the rotational drive of the motor 12 thereafter with the encoder count value picked up from the rising/falling edges of the A phase signal and the B phase signal. Then, at a time of ending of the initial drive, the relationship is established, i.e., learned, among the encoder count value and the rotation position and the power supply phase of the motor 12.

Further, the microcomputer 41 can only detect an amount of rotation (i.e., the rotation angle) from the rotation start position of the motor 12 based on the encoder count value after the start, i.e., the power ON, of the motor 12. Therefore, after the power ON of the motor 12, unless the microcomputer 41 somehow detects an absolute rotation position by using a certain method, the motor 12 cannot be correctly rotated to a target rotation position.

Thus, the motor 12 is rotated, after the end of the initial drive, by the microcomputer 41 until the rotation position of the motor 12 comes to, or abuts on, a limit position of a rotatable range of the shift position switch mechanism 11, for learning the limit position of the rotatable range as a reference position. Then, with reference to the encoder count value at such a reference position, the rotation amount, i.e., the rotation angle, of the motor 12 is controlled.

After learning the reference position, the microcomputer 41 changes the target rotation position (i.e., a target encoder count value) according to the switching of the target shift position. The switching of the target shift position may result from a shift position switch request due to the driver's operation of the shift lever or the like.

Then, the microcomputer 41 switches the power supply phase of the motor 12 one-by-one, based on the encoder count value, and performs the motor control, in which the rotational drive of the motor 12 is performed to rotate the motor 12 to the target rotation position that corresponds to the target shift position. In such manner, the shift position is brought to the target shift position (i.e., the position of the shift position switch mechanism 11 is switched to the target shift position).

The microcomputer 41 is equivalent to a motor controller as recited in the claims.

Based on the above configuration, when abnormality occurs in the encoder 46, as shown in FIGS. 6 and 7, the abnormal pulse state results.

Figure 6A:
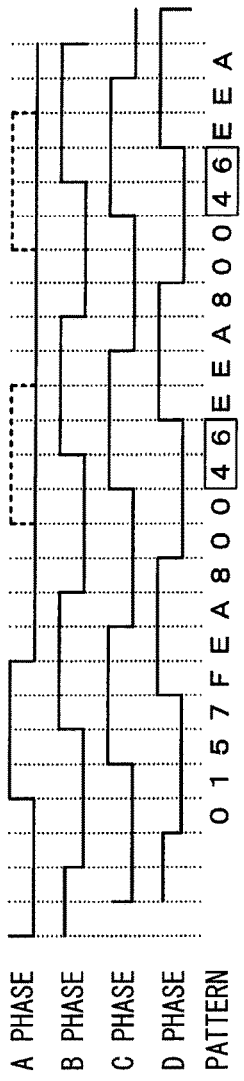
FIG. 6A is an illustration of the abnormal pattern when the pulse signal adheres to an L level in an abnormal state in the one embodiment of the present disclosure.
Figure 6B:
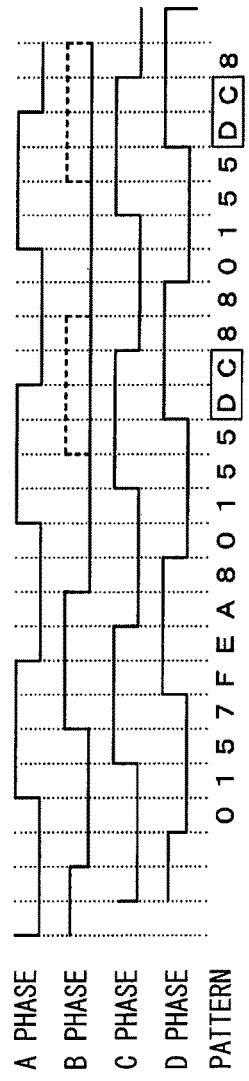
FIG. 6B is another illustration of the abnormal pattern when the pulse signal adheres to an L level in an abnormal state in the one embodiment of the present disclosure.
Figure 6C:
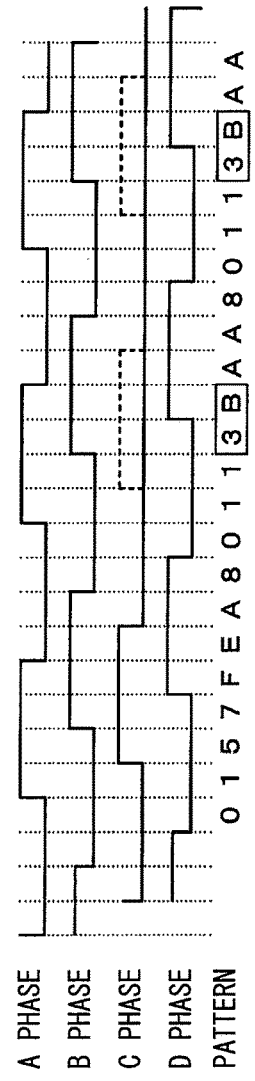
FIG. 6C is another illustration of the abnormal pattern when the pulse signal adheres to an L level in an abnormal state in the one embodiment of the present disclosure.
Figure 6D:
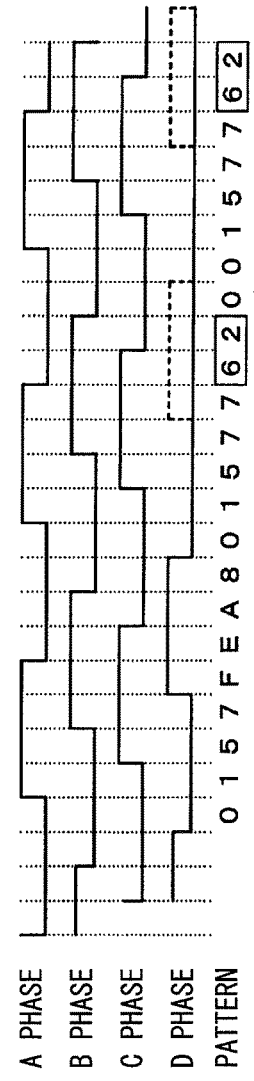
FIG. 6D is another illustration of the abnormal pattern when the pulse signal adheres to an L level in an abnormal state in the one embodiment of the present disclosure.

For example, as shown in FIG. 6A, when an L level adhesion abnormality occurs in the A phase signal, i.e., the A phase signal always sticking to the L level, the abnormal pulse state occurs either as the pattern 4, or the pattern 6. When the L level adhesion abnormality occurs in the B phase signal, as shown in FIG. 6B, the abnormal pulse state occurs either as the pattern D, or the pattern C. When the L level adhesion abnormality occurs in the C phase signal, as shown in FIG. 6C, the abnormal pulse state occurs either as the pattern 3, or the pattern B. When the L level adhesion abnormality occurs in the D phase signal, as shown in FIG. 6D, the abnormal pulse state occurs either as the pattern 6, or the pattern 2.

Figure 7A:
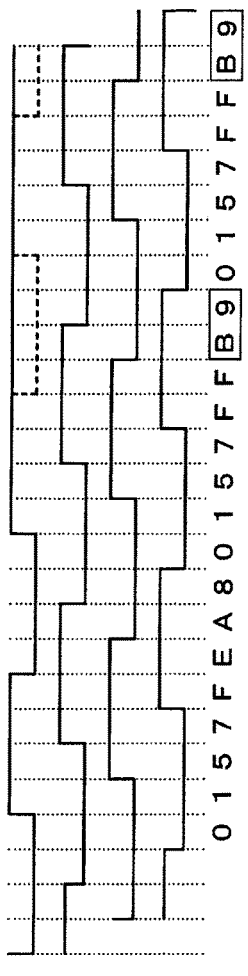
FIG. 7A is an illustration of the abnormal pattern when the pulse signal adheres to an H level in an abnormal state in the one embodiment of the present disclosure.
Figure 7B:
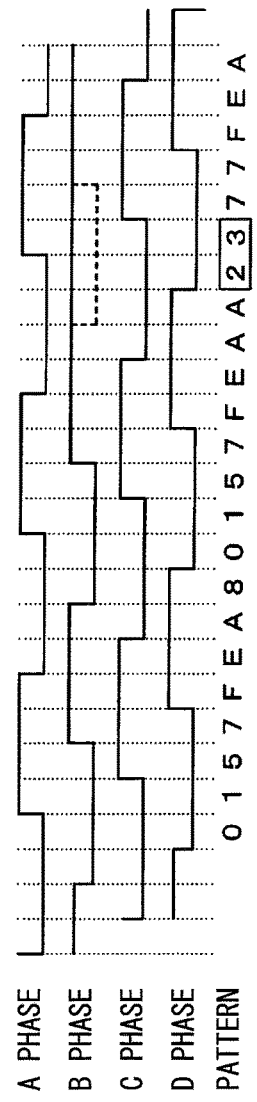
FIG. 7B is another illustration of the abnormal pattern when the pulse signal adheres to an H level in an abnormal state in the one embodiment of the present disclosure.
Figure 7C:
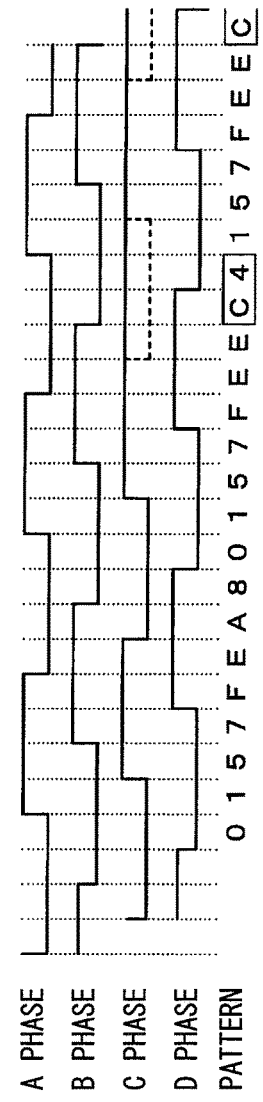
FIG. 7C is another illustration of the abnormal pattern when the pulse signal adheres to an H level in an abnormal state in the one embodiment of the present disclosure.
Figure 7D:
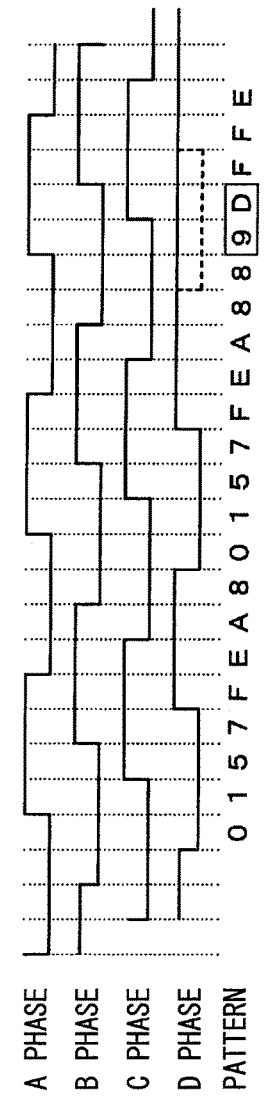
FIG. 7D is another illustration of the abnormal pattern when the pulse signal adheres to an H level in an abnormal state in the one embodiment of the present disclosure.

Further, as shown in FIG. 7A, when an H level adhesion abnormality occurs in the A phase signal, i.e., the A phase signal always sticking to the H level, the abnormal pulse state occurs either as the pattern B, or the pattern 9. When the H level adhesion abnormality occurs in the B phase signal, as shown in FIG. 7B, the abnormal pulse state occurs either as the pattern 2, or the pattern 3. When the H level adhesion abnormality occurs in the C phase signal, as shown in FIG. 7C, the abnormal pulse state occurs either as the pattern C, or the pattern 4. When the L level adhesion abnormality occurs in the D phase signal, as shown in FIG. 7D, the abnormal pulse state occurs either as the pattern 9, or the pattern D.

On the other hand, when the noise overlaps, or rides, on the output signal of the encoder 46, the abnormal pulse state also occurs. Here, a time interval or a lapse time from the last/latest (i.e., immediately before) normal output timing (which is an output timing of the pulse signal in a compliant manner with a preset rule) to the happening of the abnormal pulse state is shorter than a normal pulse cycle (which is a time interval or a lapse time between two normally output pulse signals in a compliant manner with the preset rule). Further, such an abnormal pulse state is considered as returning to the normal pulse state in a relatively short time.

In consideration of such characteristic behavior, the abnormality diagnosis in the present embodiment is performed in the following manner, i.e., by performing an abnormality diagnosis routine shown in FIGS. 12 and 13, which is later mentioned, by the microcomputer 41 of the shift position switching control circuit 42.

That is, during a rotational drive of the motor 12, when (i) it is determined as being in the abnormal pulse state, and (ii) the lapse time from the last normal output timing is longer than the preset threshold determination time, it is conclusively determined that the encoder 46 has abnormality.

In other words, when the abnormal pulse state occurs and the lapse time from the last normal output timing is longer than the preset threshold determination time, it is determined that the abnormality has occurred in the encoder 46 to cause the abnormal pulse state, and it is conclusively determined that the encoder 46 has abnormality.

Further, even when the lapse time from the last normal output timing is equal to or less than the preset threshold determination time when the abnormal pulse state occurs, in case that the lapse time in the abnormal pulse state continues/extends thereafter to exceed the preset threshold determination time, it is determined that abnormality has occurred in the encoder 46 and is conclusively determined that the encoder 46 has abnormality.

On the other hand, even when the abnormal pulse state has occurred, in case that the abnormal pulse state returns to the normal pulse state before the lapse time exceeds the preset threshold determination time, it is determined that the abnormal pulse state is temporarily caused due to an overlap of a noise on the pulse signal that is output from the encoder 46, that is, it is not conclusively determined that the encoder 46 has abnormality.

In such manner, when the abnormal pulse state is temporarily caused due to an overlap of a noise on the pulse signal that is output from the encoder 46, a false determination that the encoder 46 has abnormality is prevented.

An example of how the abnormality diagnosis of the present embodiment is performed is described with reference to FIGS. 8 to 11.

As shown in FIGS. 8 to 11, it is determined whether the pulse signal of the encoder 46 is outputted based on whether the rising edge of the pulse signal or the falling edge of the pulse signal has been detected.

Then, whenever it is determined that the pulse signal of the encoder 46 is outputted (i.e., is changed), a pulse cycle T is computed. Here, the pulse cycle T is defined as a time interval between the current output timing and the subsequent output timing of the pulse signal of the encoder 46.

Further, whenever it is determined that the pulse signal of the encoder 46 is outputted, it is determined whether the pulse signal is in the pulse normal state based on whether the combination pattern of the pulse signals in each of four phases is one of the normal patterns (e.g., 0, 1, 5, 7, 8, A, E, or F) indicative of the normal pulse state.

As a result, when it is determined that it is in the abnormal pulse state, upon having such determination at time t3, the current pulse cycle T (i.e., the lapse time from the last normal output timing t2) is defined as an abnormality-caused pulse cycle Tb, and it is determined whether the abnormality-caused pulse cycle Tb is longer than the preset threshold determination time K.

In such case, the last pulse cycle T (i.e., the time interval between the last normal output timing t2 and the previous-to-last output timing t1 at which the pulse signal is outputted in a compliant manner with the preset rule) is defined as a normal pulse cycle Ta, and the preset threshold determination time K is set up according to the normal pulse cycle Ta.

In the present embodiment, a value derived by multiplying the normal pulse cycle Ta by a preset coefficient (e.g., 1.5) is set up as the preset threshold determination time K.

Figure 8:
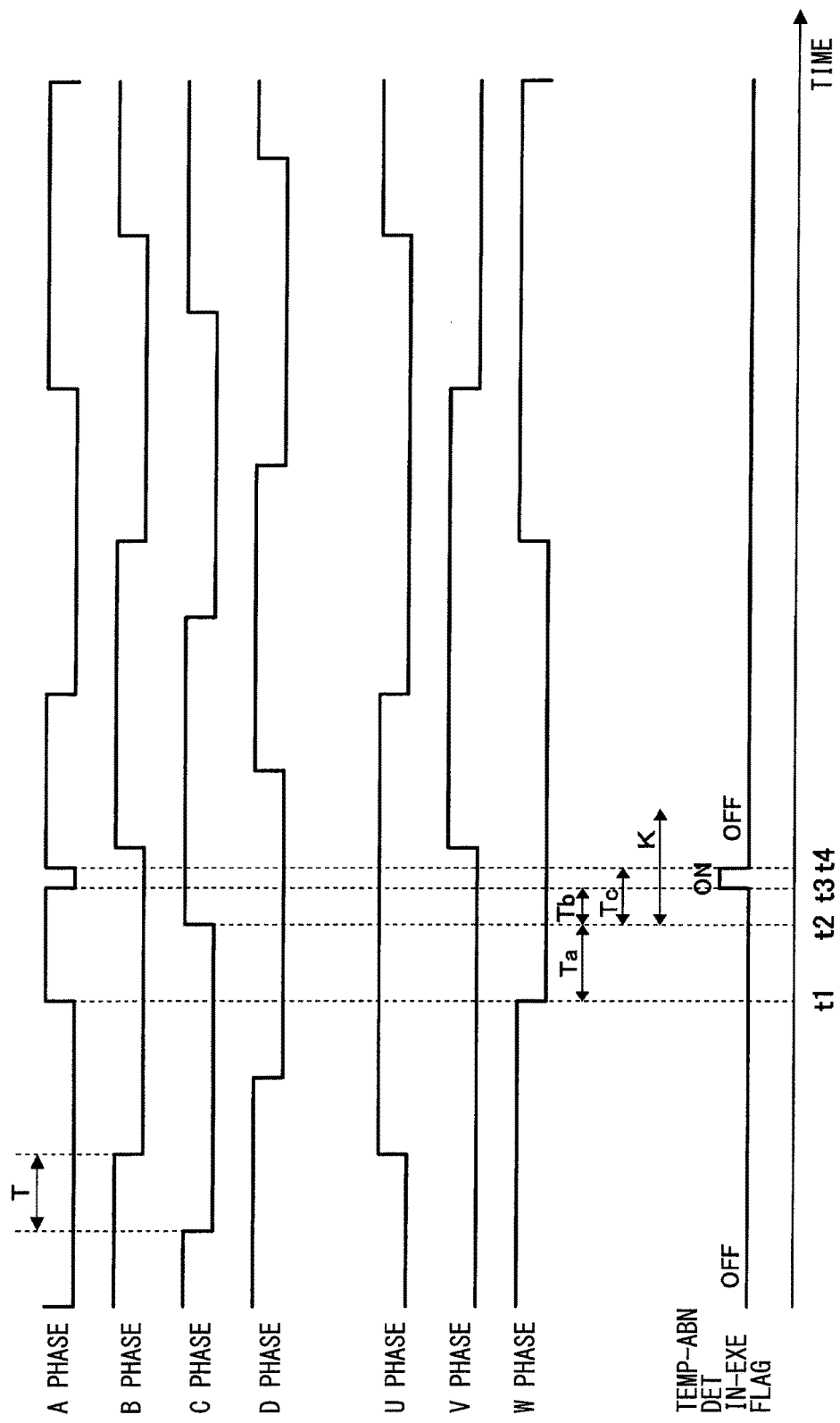
FIG. 8 is a time chart of a first example of an abnormality diagnosis in the one embodiment of the present disclosure.
Figure 9:
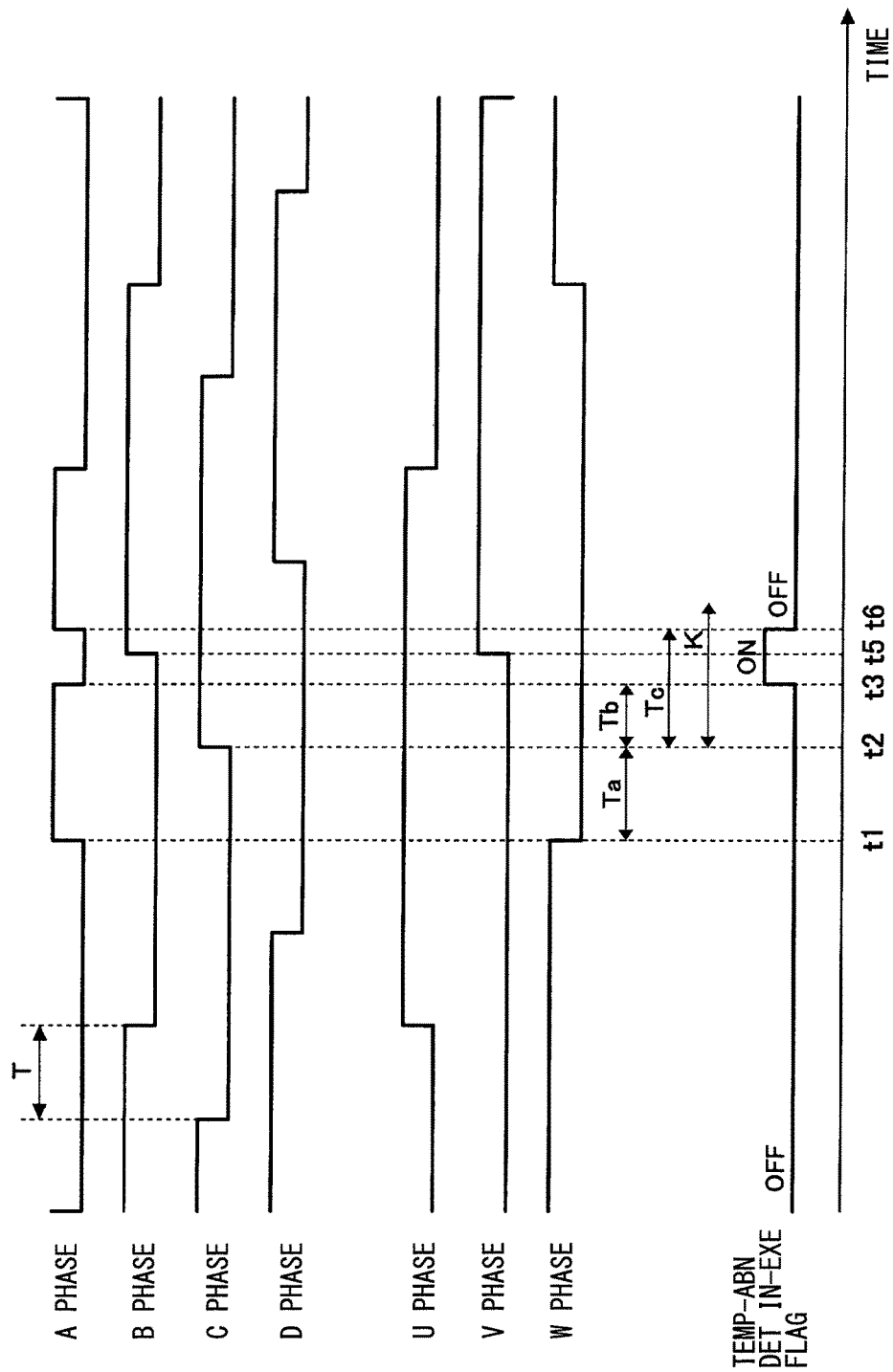
FIG. 9 is a time chart of a second example of the abnormality diagnosis in the one embodiment of the present disclosure.

As shown in FIGS. 8 and 9, when the abnormality-caused pulse cycle Tb is determined as being equal to or shorter than the preset threshold determination time K at time t3 at which it is determined as being in the abnormal pulse state, a temporary-abnormality determination in-execution flag is set to ON. In such case, the drive state of the motor 12 is not changed (i.e., the power supply phase of the motor 12 is not switched).

After the temporary-abnormality determination in-execution flag is set to ON, it is determined whether it is conclusively determined that the encoder 46 has abnormality based on whether a lapse time Tc from the last normal output timing t2 is longer than the preset threshold determination time K.

Although not shown in FIGS. 8 and 9, in case that the abnormal pulse state has continued for a long time, i.e., when the lapse time Tc from the 1st normal output timing t2 exceeds the preset threshold determination time K, as soon as such an extended abnormal pulse state is observed, it is conclusively determined that the encoder 46 has abnormality, based on a determination that the abnormal pulse state has occurred due to abnormality in the encoder 46.

On the other hand, when the abnormal pulse state returns to the normal pulse state before it is conclusively determined that the encoder 46 has abnormality (i.e., before the lapse time Tc from the last normal output timing t2 exceeds the preset threshold determination time K) as shown in FIG. 8, at time t4 of such determination, it is determined that a temporary abnormal pulse state has occurred due to an overlapping noise on the output signal of the encoder 46, and it is not conclusively determined that the encoder 46 has abnormality.

In such case, the temporary-abnormality determination in-execution flag is reset to OFF, and the motor control is resumed, in which the power supply phase of the motor 12 is switched based on the encoder count value, for the rotational drive of the motor 12.

Further, when it is again determined that it is in the abnormal pulse state after the temporary-abnormality determination in-execution flag is set to ON as shown in FIG. 9, upon having such determination at time t5, it is determined whether the lapse time Tc from the last normal output timing t2 is longer than the preset threshold determination time K.

When the lapse time Tc is determined to be equal to or shorter than the preset threshold determination time K, the temporary-abnormality determination in-execution flag is kept to ON, and the drive state of the motor 12 is not changed.

Then, when the abnormal pulse state returns to the normal pulse state before it is conclusively determined that the encoder 46 has abnormality (i.e., before the lapse time Tc from the last normal output timing t2 exceeds the preset threshold determination time K), upon having such determination at time t6, it is determined that the noise overlaps on the output signal of the encoder 46 to temporarily cause the abnormal pulse state, and it is not conclusively determined that the encoder 46 has abnormality.

In such case, the temporary-abnormality determination in-execution flag is reset to OFF, and the motor control is resumed, in which the power supply phase of the motor 12 is switched based on the encoder count value, for the rotational drive of the motor 12.

Figure 10:
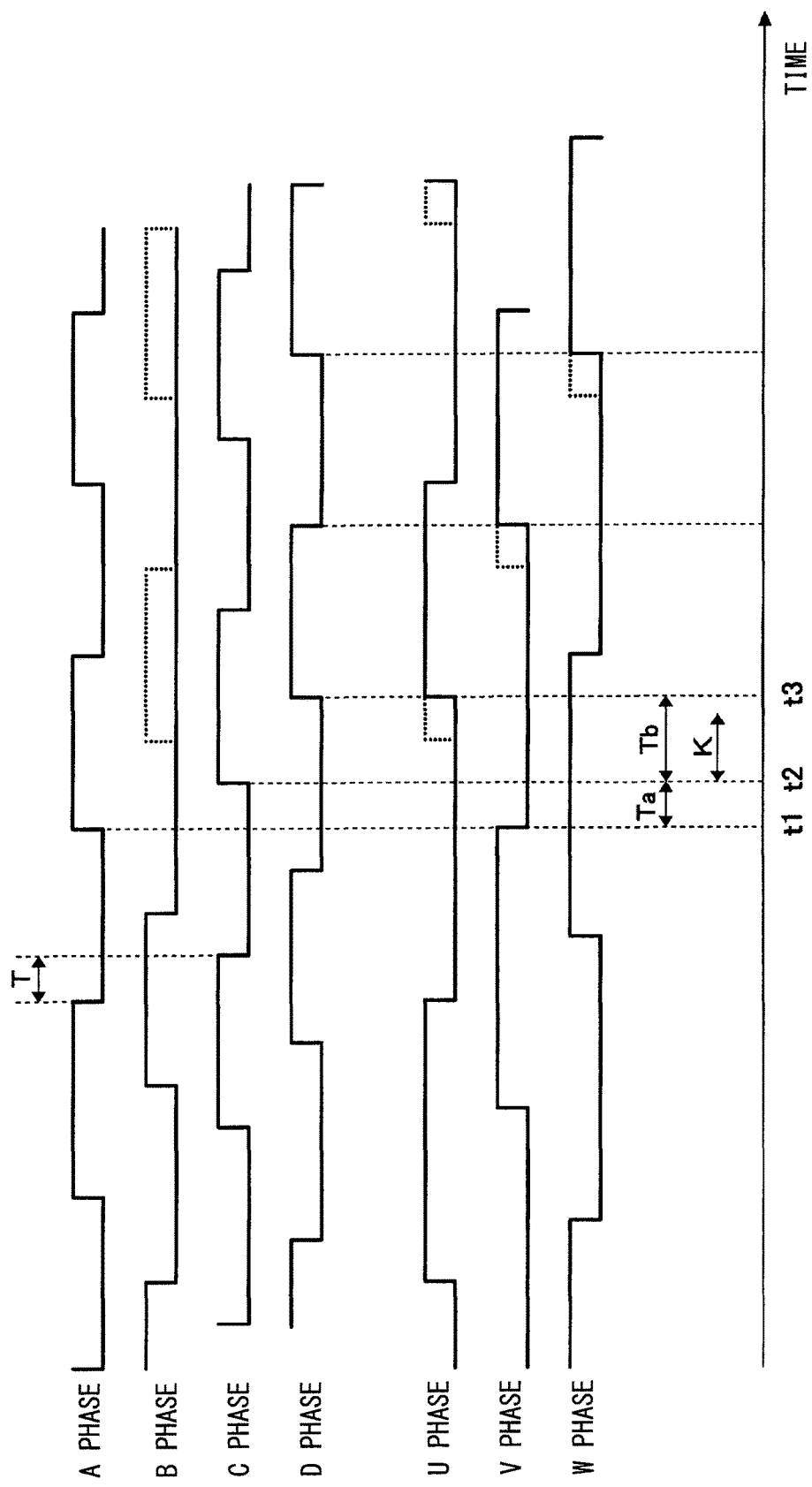
FIG. 10 is a time chart of a third example of the abnormality diagnosis in the one embodiment of the present disclosure.
Figure 11:
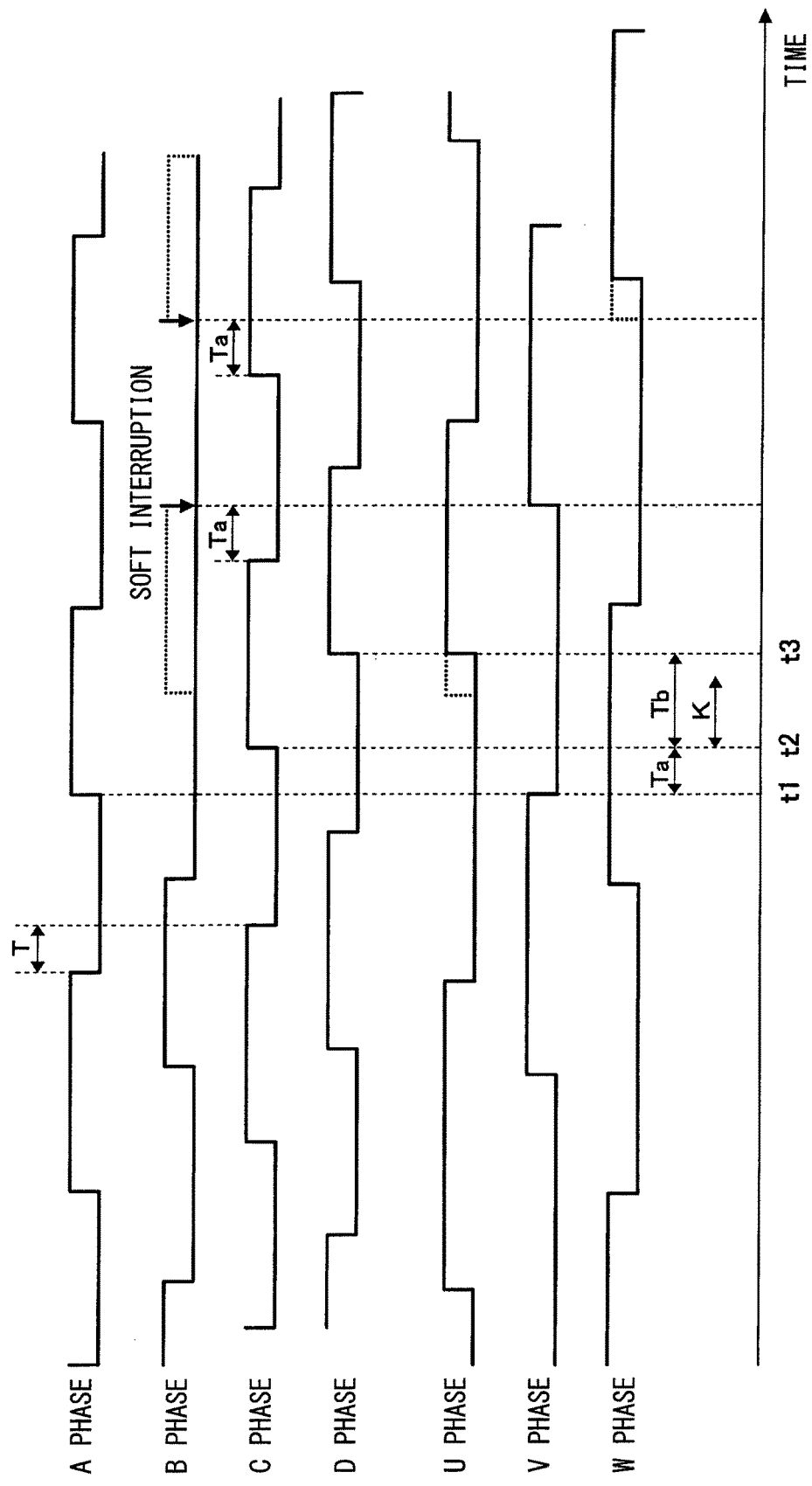
FIG. 11 is a time chart of a fourth example of the abnormality diagnosis in the one embodiment of the present disclosure.

On the other hand as shown in FIGS. 10 and 11, when it is determined that the abnormality-caused pulse cycle Tb is longer than the preset threshold determination time K at time t3, at which it is determined as being in the abnormal pulse state, upon having such determination at time t3, it is determined that the abnormal pulse state has occurred due to the abnormality of the encoder 46. Also, it is conclusively determined that the encoder 46 has abnormality.

When it is conclusively determined that the encoder 46 has abnormality, it is further determined which one of the pulse signals output in each of those phases has abnormality.

For example, when no pulse signal is output (i.e., when the edge of the pulse signal is not detected) for a certain period of time or longer than that, it is determined that the pulse signal of such phase is abnormal.

Then, the motor control is performed by using only the output timing of the pulse signal in the normal output phase(s) among all pulse signals.

For example, as shown in FIG. 10, in case that the B phase signal is abnormal, instead of using the edge of the pulse signal in the B phase (i.e., instead of using the pulse signal in the abnormal output phase), the edge of the D phase signal (i.e., the edge of the pulse signal in the normal output phase) is used.

Then, the encoder count value is changed by using the edge of the pulse signal in the A phase and the edge of the pulse signal in the D phase, and the power supply phase of the motor 12 is switched based on the encoder count value, for the rotational drive of the motor 12.

Alternatively, from among the pulse signals in all phases, based on the output timing of the pulse signal in the normal output phase, the normal output timing of the pulse signal in the abnormal output phase may be predicted, and the predicted output timing may be used for performing the motor control.

For example, as shown in FIG. 11, when the B phase signal is abnormal, a time interval between the edge of the pulse signal in the A phase (i.e., the pulse signal in a normal output phase) and the edge of the pulse signal in the C phase (i.e., the pulse signal in the normal output phase) is computed as a normal edge interval Ta (i.e., as a period of time equivalent to the normal pulse cycle Ta).

Based on the normal edge interval Ta and the edge of the pulse signal in the C phase, the normal edge timing of the pulse signal in the B phase (i.e., the pulse signal in the abnormal output phase) is predicted.

A soft interruption is generated at the predicted edge timing, and such soft interruption is used as a substitute of the edge of the pulse signal in the B phase.

Then, the encoder count value is changed by using the edge of the pulse signal in the A phase and the soft interruption, and the power supply phase of the motor 12 is switched based on the encoder count value, for the rotational drive of the motor 12.

Figure 12:
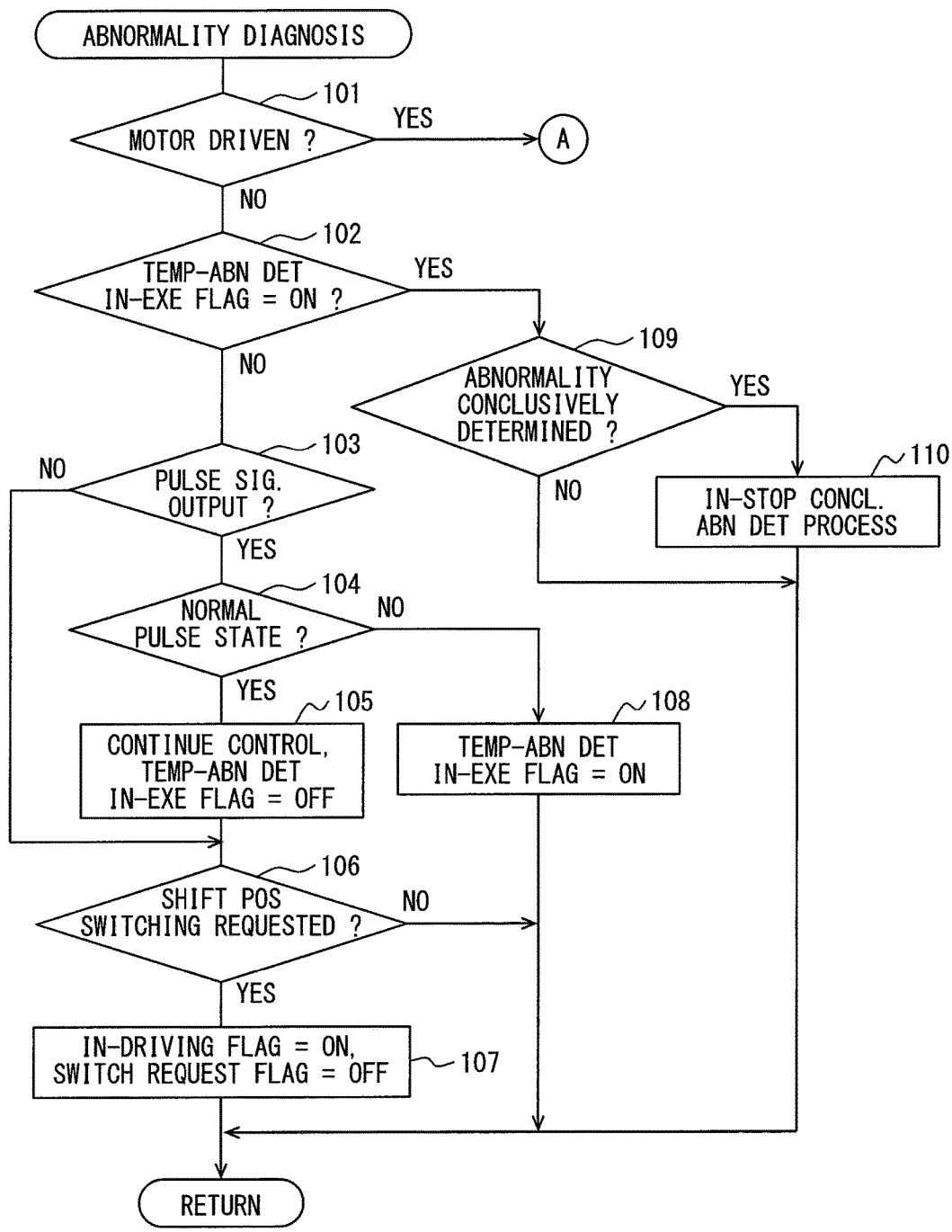
FIG. 12 is a flowchart of a first part of an abnormality diagnosis process in the one embodiment of the present disclosure.
Figure 13:
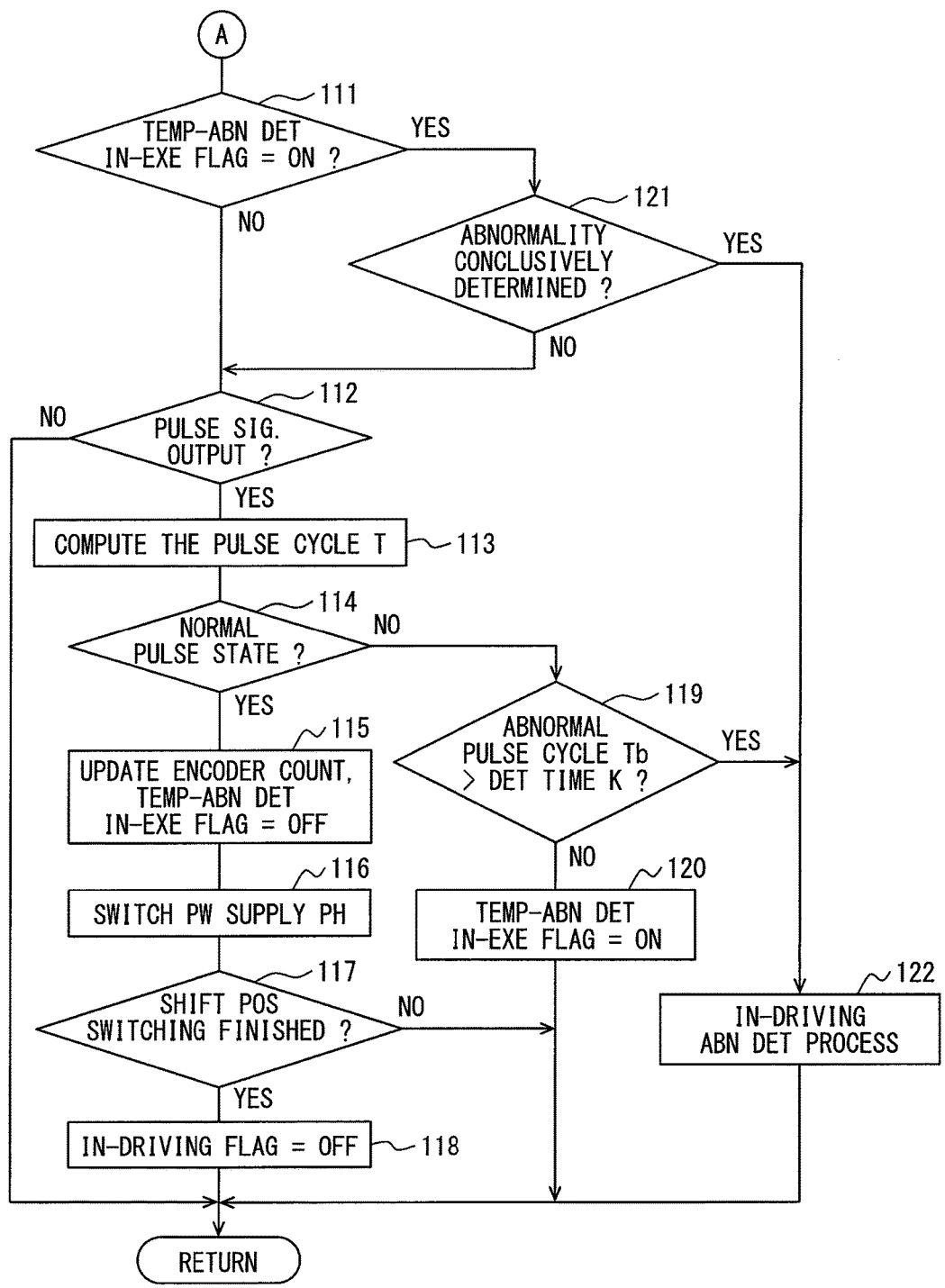
FIG. 13 is a flowchart of a second part of the abnormality diagnosis process in the one embodiment of the present disclosure.

The abnormality diagnosis of the present embodiment described above is performed according to the abnormality diagnosis routine shown in FIGS. 12 and 13 by the microcomputer 41 of the shift position switching control circuit 42.

Hereafter, the contents of the process of the abnormality diagnosis routine are described.

The abnormality diagnosis routine shown in FIGS. 12 and 13 is repeatedly executed by the microcomputer 41 at a preset cycle during a power ON time of the shift position switching control circuit 42, after the initial drive and a reference position learning, and is equivalent to a determiner in the claims.

When the routine is started, in step 101, it is determined whether the motor 12 is in the drive state. That is, whether an in-driving flag is set to ON is determined in step 101.

When it is determined in step 101 that the motor 12 is not in the drive state (i.e., the motor 12 is stopping), the process proceeds to step 102.

In step 102, it is determined whether the temporary-abnormality determination in-execution flag is ON.

In step 102, when the temporary-abnormality determination in-execution flag is determined to be OFF, the process proceeds to step 103.

It is then determined in step 103 whether the pulse signal of the encoder 46 is outputted based on whether the rising or falling edge of the pulse signal of one of the A phase signal to the D phase signal is detected.

When it is determined that the pulse signal of the encoder 46 is outputted (i.e., when it is determined that the signal is changed) in step 103, the process proceeds to step 104.

In step 104, it is determined whether it is in the normal pulse state based on whether the combination pattern of the pulse signals in each of four phases is one of the normal patterns (e.g., 0, 1, 5, 7, 8, A, E, or F) indicative of the normal pulse state.

In step 104, when it is determined as being in the normal pulse state, the process proceeds to step 105.

In step 105, after resetting the temporary-abnormality determination in-execution flag to OFF and the present control state being continued, the process proceeds to step 106.

On the other hand, when it is determined that the pulse signal of the encoder 46 is not outputted (i.e., when it is determined that the signal is not changed) in the above-mentioned step 103, the process proceeds to step 106, without performing steps 104 and 105.

In step 106, it is determined whether a shift position switching request is generated based on whether a switch request flag is ON.

When it is determined that the shift position switching request is not generated in step 106, the routine is finished as it is, i.e., without performing any other steps.

Then, when it is determined that the shift position switching request is generated at the above-mentioned step 106, the process proceeds to step 107.

In step 107, the in-driving flag is set to ON and the switch request flag is reset to OFF, and the routine is finished.

On the other hand, when it is determined that it is not being in the normal pulse state (i.e., in the abnormal pulse state) in the above-mentioned step 104, the process proceeds to step 108.

In step 108, the temporary-abnormality determination in-execution flag is set to ON, and the routine is finished.

Then, in the above-mentioned step 102, when it is determined that the temporary-abnormality determination in-execution flag is set to ON, the process proceeds to step 109.

In step 109, whether to conclusively determine that the encoder 46 has abnormality is determined based on, for example, whether the abnormal pulse state has continued for or more than the predetermined time.

When the abnormality of the encoder 46 is conclusively determined in step 109, the process proceeds to step 110. Then, in step 110, an in-stop conclusive abnormality determination process is performed. In the in-stop conclusive abnormality determination process, an encoder abnormality flag is set to ON during the stop, for example.

On the other hand, in the above-mentioned step 101, when it is determined that the drive of the motor 12, the process proceeds to step 111 of FIG. 13.

In step 111, it is determined whether the temporary-abnormality determination in-execution flag is ON.

In step 111, when the temporary-abnormality determination in-execution flag is determined to be OFF, the process proceeds to step 112. It is then determined in step 112 whether the pulse signal of the encoder 46 is outputted based on whether the rising edge of the pulse signal or the falling edge of the pulse signal is detected in one of the A phase signal to the D phase signal.

When it is determined in step 112 that the pulse signal of the encoder 46 is outputted (i.e., the signal is changed), the process proceeds to step 113. In step 113, the pulse cycle T is computed. In such case, the time interval from the last output timing of the pulse signal of the encoder 46 to the current timing is computed as the pulse cycle T.

Then, the process proceeds to step 114, and it is determined whether it is in the normal pulse state based on whether the combination pattern of the pulse signals in each of four phases is one of the normal patterns (e.g., 0, 1, 5, 7, 8, A, E, or F) indicative of the normal pulse state.

In step 114, when it is determined as being in the normal pulse state, the process proceeds to step 115.

In step 115, the encoder count value is updated and the temporary-abnormality determination in-execution flag is reset to OFF.

Then, the process proceeds to step 116, and the power supply phase of the motor 12 is switched based on the encoder count value.

Then, the process proceeds to step 117, and it is determined whether the shift position switching is finished based on whether the motor 12 has rotated to the target rotation position (i.e., whether the encoder count value has reached a target count value), for example.

When it is determined in step 117 that the shift position switching has not been finished, the routine is finished as it is, i.e., without performing any other steps.

Then, i.e., thereafter, when it is determined that the shift position switching has been finished in the above-mentioned step 117, the process proceeds to step 118. In step 118, the in-driving flag is reset to OFF, and the routine is finished.

On the other hand, when it is determined as not being in the normal pulse state (i.e., in the abnormal pulse state) in the above-mentioned step 114, the process proceeds to step 119.

In step 119, the current pulse cycle T (i.e., the lapse time from the last normal output timing) is defined as the abnormality-caused pulse cycle Tb, and it is determined whether the abnormality-caused pulse cycle Tb is longer than the preset threshold determination time K.

In such case, the last pulse cycle T (i.e., the time interval between the last normal output timing and the previous-to-last output timing at which the pulse signal is outputted in a compliant manner with the preset rule) is defined as the normal pulse cycle Ta, and the preset threshold determination time K is set up according to the normal pulse cycle Ta.

In the present embodiment, a value derived by multiplying the normal pulse cycle Ta by the preset coefficient is set up as the preset threshold determination time K. Here, the coefficient may have a value between 1 and 2 (e.g., 1.5).

In step 119, when it is determined that the abnormality-caused pulse cycle Tb is longer than the preset threshold determination time K, it is conclusively determined that the encoder 46 has abnormality, and the process proceeds to step 122. In step 122, the in-driving abnormality determination process is performed. In the in-driving abnormality determination process, the encoder abnormality flag is set to ON, for example. Further, the motor control is performed by using the output timing of the pulse signal in the normal phase among all pulse signals. Alternatively, based on the output timing of the pulse signal in the normal phase among all pulse signals, the normal output timing of the pulse signal in the abnormal phase is predicted, and the motor control is performed by using the predicted output timing.

On the other hand, in the above-mentioned step 119, when the abnormality-caused pulse cycle Tb is determined to be equal to or shorter than the preset threshold determination time K, the process proceeds to step 120.

In step 120, the temporary-abnormality determination in-execution flag is set to ON, and the routine is finished. In such case, the drive state of the motor 12 is not changed (i.e., the power supply phase of the motor 12 is not switched).

Then, i.e., thereafter, in the above-mentioned step 111, when the temporary-abnormality determination in-execution flag is determined to be ON, the process proceeds to step 121. In step 121, whether the encoder 46 has abnormality is conclusively determined based on whether the lapse time Tc from the last normal output timing is longer than the preset threshold determination time K.

When, in step 121, the lapse time Tc from the last normal output timing is determined to be equal to or shorter than the preset threshold determination time K, thereby it is not conclusively determined that the encoder 46 has abnormality, the process returns to step 112.

When, in step 114, it is determined as being in the normal pulse state at a timing before it is conclusively determined that the encoder 46 has abnormality (i.e., before the lapse time Tc from the last normal output timing exceeds the preset threshold determination time K), the process proceeds to step 115.

In step 115, after updating the encoder count value and resetting the temporary-abnormality determination in-execution flag to OFF, the process proceeds to step 116, and the power supply phase of the motor 12 is switched based on the encoder count value. In such manner, the motor control is resumed.

In case it is again determined in step 114 as being in the abnormal pulse state after the temporary-abnormality determination in-execution flag is set to ON, it is determined whether the lapse time Tc from the last normal output timing is longer than the preset threshold determination time K.

When the lapse time Tc is determined to be equal to or shorter than the preset threshold determination time K, the temporary-abnormality determination in-execution flag is maintained to (i.e., is kept unchanged from) ON, and the drive state of the motor 12 is not changed.

On the other hand, when it is conclusively determined in the above-mentioned step 121 that the encoder 46 has abnormality due to a determination that the lapse time Tc from the last normal output timing is longer than the preset threshold determination time K, the process proceeds to step 122.

In step 122, the in-driving abnormality determination process is performed.

In the present embodiment described above, the encoder 46 is provided for outputting the pulse signal in the four phases in accordance with the preset rule according to the rotation of the rotor 32 of the motor 12.

Then, during the rotational drive of the motor 12, when (i) it is determined as being in the abnormal pulse state, and (ii) the lapse time from the last normal output timing is longer than the preset threshold determination time K, it is conclusively determined that the encoder 46 has abnormality.

In such manner, when the noise overlaps on the output signal of the encoder 46 to temporarily cause the abnormal pulse state, a false determination of abnormality of the actually-normally-operating encoder 46 is prevented, thereby improving the noise-proof characteristics.

Further, in the present embodiment, by defining the normal pulse cycle Ta as the time interval between the last normal output timing and the previous-to-last output timing at which the pulse signal is output in a compliant manner with the preset rule, the preset threshold determination time K is set up according to the normal pulse cycle Ta.

Thereby, the preset threshold determination time K is set up based on the normal pulse cycle Ta (i.e., based on the time interval between the outputs of the pulse signal in a compliant manner with the preset rule).

Further, corresponding to the change of the normal pulse cycle Ta, which results from the change of the rotation speed of the motor 12 (i.e., the change of the rotation speed of the rotor 32), the preset threshold determination time K can be adjustably changed, which enables an appropriate setting of the preset threshold determination time K.

Further, in the present embodiment, when (i) it is determined as being in the abnormal pulse state, and (ii) the lapse time from the last normal output timing is equal to or shorter than the preset threshold determination time K, the drive state of the motor 12 is not changed (i.e., the power supply phase of the motor 12 is not switched). In such manner, a switching of the power supply phase of the motor 12 at a wrong timing is prevented.

Further, in the present embodiment, even when, i.e., even after, the abnormal pulse state occurs, in case that the abnormal pulse state returns to the normal pulse state before the encoder 46 is conclusively determined as abnormal (i.e., before the lapse time from the last normal output timing exceeds the preset threshold determination time K), the motor control is resumed. In such manner, when it is not conclusively determined that the encoder 46 has abnormality (i.e., when the normal pulse state is recovered before a conclusive determination of abnormality of the encoder 46), the motor control is quickly resumable.

Further, in the present embodiment, when it is conclusively determined that the encoder 46 has abnormality, the motor control is performed by using only the output timing of the pulse signal in the normal phase(s) among all pulse signals. Alternatively, from among the pulse signals in all phases, based on the output timing of the pulse signal in the normal output phase, the normal output timing of the pulse signal in the abnormal output phase is predicted, and the predicted output timing is used for performing the motor control. In such manner, even when the encoder 46 is conclusively determined as abnormal, the motor control is performable without using the pulse signal in the abnormal output phase.

In view of the motor rotation mechanism from magnetic stability, the following consideration has been made.

That is, during the rotational drive of the motor 12, the rotor and the stator of the motor 12 are put in a magnetically stable state, for the start of rotation. For example, as shown in FIG. 14A, a certain phase receives a power supply (i.e., the U phase in this case), and a salient pole of the rotor and a salient pole of the stator are brought to face each other. In such state, no rotation torque is generated.

Next, as shown in FIG. 14B, the power supply phase is switched by a rotor angle of 15 degrees (e.g., the power supply phase is switched to the V phase from the U phase). Thereby, the rotation torque is generated. In such case, the pulse signal is generated at every 3.75 degree rotation of the rotor.

Then, as shown in FIG. 14C, before the rotation torque diminished by the facing of the rotor salient pole and the stator salient pole, the power supply phase is switched, (e.g., the power supply phase is switched from the V phase to the V phase and the W phase).

Such operation is repeated, and the rotor of the motor 12 is rotated. Therefore, rotation of the rotor may be continued in case that the switching of the power supply phase is delayed, as long as the delay is within a certain range.

In the example of FIGS. 14A to 14C, the power supply phase is switched by the rotor angle of 15 degree at the rotation start time, and thereafter one phase power supply and two phase power supply are switched at every 7.5 degree rotation.

Therefore, even when the switching of the power supply phase is delayed by 7.5 degrees due to a temporary noise, as long as the frequency of such delay is low, dis-synchronization will not happen. Further, when the delay occurs by 3.75 degrees, a regular delay of the switching of the power supply phase will not lead to dis-synchronization. Based on such understanding, the preset threshold determination time K (i.e., an allowed time to abnormality determination) may be set.

For example, the preset threshold determination time K may be restricted to be equal to or shorter than a 7.5 degree equivalent time (or a 3.75 degree equivalent time).

In the above-mentioned embodiment, the preset threshold determination time K is set up according to the pulse cycle Ta (i.e., the time interval between the last normal output timing and the previous-to-last output timing of the pulse signal in a compliant manner with the preset rule).

However, it is not limited to such scheme, but the preset threshold determination time K may also be set up according to information relevant to the normal pulse cycle Ta, including for example, the time interval of the switching of the power supply phase of the motor 12, the rotation speed of the motor 12, and the like.

When the preset threshold determination time K is set up according to the rotation speed of the motor 12, the preset threshold determination time K is made shorter as the rotation speed of the motor 12 increases, and the preset threshold determination time K is made longer as the rotation speed of the motor 12 decreases.

However, when used in a system in which the rotation speed of the motor 12 is not largely changed, the preset threshold determination time K may be set to a preset fixed value.

In the above-mentioned embodiment, the function executed by the microcomputer 41 may be partially or as a whole implemented by a plurality of ICs or the like, i.e., may be provided by hardware.

Further, although the present disclosure is applied to the system provided with the encoder outputting the pulse signal of the four phases in the above-mentioned embodiment, it is not necessarily limited to such form, but the present disclosure may be applied to a system provided with the encoder outputting the pulse signal in three phases or the pulse signal in five or more phases.

In the above-mentioned embodiment, the present disclosure is applied to the system provided with the shift position switching mechanism which switches between the two positions, i.e., between the P position and the Non-P position.

However, the present disclosure may also be applied to a system provided with the shift position switching mechanism of, for example, four shift positions among the P position, the R position, the N position and the D position. Further, the number of shift positions may be three or may be five or more.

The present disclosure is not limited to the automatic transmission (e.g., Automatic Transmission (AT), Continuously Variable Transmission (CVT), Dual-Clutch Transmission (DCT), etc.), but may also be applied to a system provided with the shift position switching mechanism which switches the shift position of the transmission (e.g., a speed reducer) of an electric vehicle.

Further, the present disclosure is not limited to the shift position switching mechanism, but may also be applicable to a system provided with various kinds of position switching mechanism having a drive power source of an Switched Reluctance (SR) motor (i.e., a brush-less synchronous motor), for example, or to a position detection device that has a pulse output section for outputting a pulse signal according to the rotation of the measurement object other than the rotor of the motor.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by the appended claims.

What is claimed is:

1. A controller comprising:
    a pulse outputter outputting a pulse signal according to a rotation of a measurement object, the pulse signal outputted as a signal having at least three phases by a rule, according to the rotation of the measurement object; and a determiner determining whether the pulse outputter has abnormality, based on the pulse signal, wherein the determiner determines that the pulse outputter has abnormality when (i) it is determined as being in an abnormal pulse state in which output of the pulse signal is non-compliant with the rule, and (ii) a lapse time from a last normal output timing is longer than a threshold determination time.

2. The controller of claim 1, wherein the determiner sets the threshold determination time according to one of (i) a time difference between (a) the last normal output timing and (b) a previous-to-last output timing of the pulse signal that is compliant with the rule or (ii) relevant information relevant to the time difference.

3. The controller of claim 1 further comprising:

a motor having a rotor that serves as the measurement object; and a motor controller performing a motor control for a rotational drive of the motor by switching a power supply phase of the motor according to the pulse signal.

4. The controller of claim 3, wherein the motor controller refrains from changing a drive state of the motor when (i) it is determined in the abnormal pulse state, and (ii) the lapse time from the last normal output timing is equal to or less than the threshold determination time.

5. The controller of claim 4, wherein the motor controller resumes the motor control, when the output of the pulse signal returns to a compliant output state in which the pulse signal is outputted by the rule (i) after becoming the abnormal pulse state, and (ii) before it is conclusively determined that the pulse outputter has abnormality.

6. The controller of claim 3, wherein the motor controller performs the motor control by using an output timing of the pulse signals in a normal output phase in which the pulse signal is outputted by the rule, when it is conclusively determined that the pulse outputter has abnormality.

7. The controller of claim 3, wherein the motor controller predicts the output timing of an abnormal phase in which the pulse signal is output in the non-compliant output manner with the rule, based on the output timing in a normal output phase in which the pulse signal is output according to the rule, and performs the motor control based on the predicted output timing, when it is conclusively determined that the pulse outputter has abnormality.

* * * * *